R. C. ROOT.
FAN CONSTRUCTION.
APPLICATION FILED MAY 13, 1919.

1,347,522.

Patented July 27, 1920.

INVENTOR.
RALPH C. ROOT.
BY
Lockwood & Lockwood
ATTORNEYS.

UNITED STATES PATENT OFFICE.

RALPH C. ROOT, OF INDIANAPOLIS, INDIANA, ASSIGNOR TO SERVICE PRODUCTS CORPORATION, OF INDIANAPOLIS, INDIANA, A CORPORATION.

FAN CONSTRUCTION.

1,347,522.  Specification of Letters Patent.  Patented July 27, 1920.

Application filed May 13, 1919. Serial No. 296,780.

*To all whom it may concern:*

Be it known that I, RALPH C. ROOT, a citizen of the United States, and a resident of Indianapolis, county of Marion, and State of Indiana, have invented a certain new and useful Fan Construction; and I do hereby declare that the following is a full, clear, and exact description thereof, reference being had to the accompanying drawings, in which like numerals refer to like parts.

This invention relates to a fan construction for cooling internal combustion engines, and more particularly to the bearings therefor, and means for retaining the same.

The main object of this invention is to construct a noiseless fan. It is well known that the noise or hum produced by a fan while driven at a high speed is caused by the friction produced on the end portions thereof. The fan is thrust rearwardly toward the motor when the motor is traveling at high speed, by the air pressure directed through the radiator against the fan, and a forward end thrust is produced when the motor is moving at a lower speed while the fan travels at a substantially higher speed, whereby in the operation of the motor driven fan upon an automobile the fan is subjected to oppositely directed end thrusts depending upon the variation in the speed of the fan and the automobile. This end thrust upon the bearings produces a noise which it is the object of this invention to overcome. This is accomplished by providing bearing surfaces on the end of the fan to take up the end thrust in either direction.

Another feature of the invention is to sustain the oil in the end of the housing containing the end thrust bearings. This is accomplished by means of an oil retaining cup constructed so as to be wedged tightly against the housing when secured therein, sealing itself and preventing the oil from escaping through the end of said housing.

Figure 1:
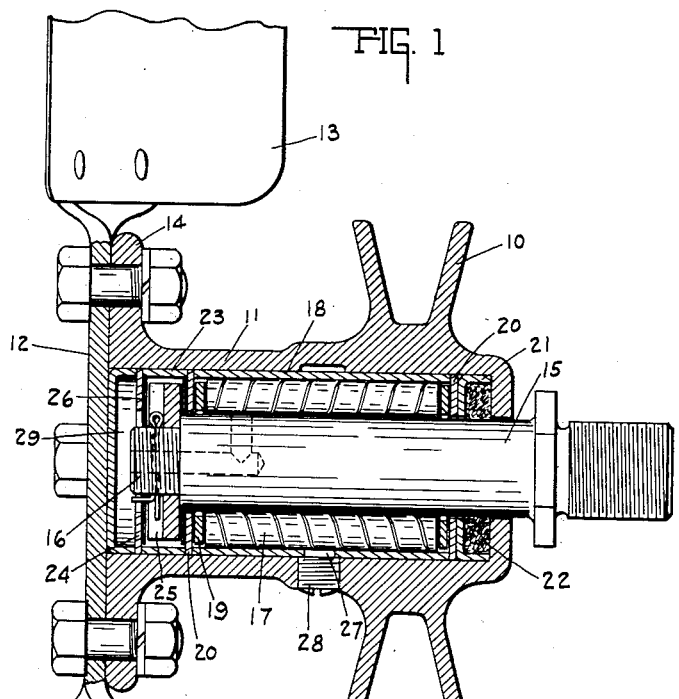
Figure 2:
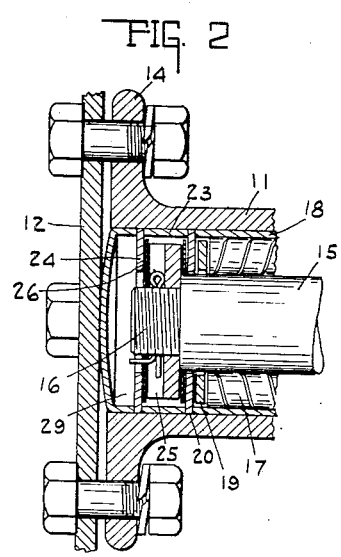

Referring to the drawings, which are made a part of this application, Figure 1 is a central vertical section through the fan construction showing the spindle and roller bearings in elevation. Fig. 2 is the same as Fig. 1 showing a partial view with the oil retaining cup before being clamped in sealing position.

In the drawings there is shown a fan construction having a pulley 10 integral with the hub 11, to which is securely bolted the fan plate bearing 12 and fan blades 13. The outer end of the hub 11 has a flange 14, with its end open. Extending into the hub there is a spindle 15 adapted to be rigidly mounted to the front end of the motor, and having a tapered threaded outer end 16. The roller bearings 17 are mounted in the hub between the bearing spacers 18 and the spindle 15, said bearings having end thrust bearings 19 pivotally mounted on each end thereof. Surrounding the spindle 15 and adjacent the end thrust bearings 19 there are steel washers 20 which abut the ends of the bearing spacers 18. At the rear end of the hub there is an oil cup 21 surrounding the spindle adjacent the rear washer 20, which is filled with the oil packing 22 and held therein by the inner end of the hub. At the outer end of said hub there is a washer spacing sleeve 23 fitting snugly within the inner surface of the hub and having its ends abutting the steel washer 20 and a similar steel washer 24.

A thick case hardened steel lock washer 25 is threaded so as to screw on the threaded tapered end of the spindle 16, the threads being loose enough to permit said washer to seat against the shoulder of the spindle. Said washer is slotted crosswise to a depth of about half its thickness to permit a cotter pin to be inserted through a hole in the end 16 and embedded in one of said slots for locking said washer in position. On each side of the washer 25 there is an end thrust bearing 26 in the form of a bronze washer 25 and the washers 20 and 24. The bearings are oiled through the recess 27, the opening to which is closed by the plug 28.

In the outer end of the hub and adjacent the washer 24, there is an oil retaining cup 29 having its inner edge abutting said washer, and closing the opening in the end of said hub for retaining the oil therein to feed the end thrust bearings 26. The said cup is formed so as to bulge slightly, as shown in Fig. 2, whereby when the plate 12 is drawn tightly against the flange 14 the bulging portion of said cup is forced inwardly, which will cause the periphery thereof to expand radially and wedge tightly against the inner surface of the hub so as to form an oil tight joint, for preventing the leakage of the oil retained therein through the outer end of said hub, and overcoming any slight misfit resulting from the forming thereof.

When the automobile is traveling at high speed there is a rearward end thrust on the fan which is taken up by the rear bearing 26 between the washers 20 and 25, and when the automobile is traveling at slow speed the speed of the fan causes a forward end thrust which is taken up by the forward bearing 26 between the washers 24 and 25.

This construction as above described providing end thrust bearings may at the same time be quickly assembled as the members will readily follow each other into position between the hub and the spindle, the washer 25 being screwed into position, then locked by the cotter pin, the cup 29 placed in position and the fan plate bolted to the flange of the hub.

The invention claimed is:

1. A fan construction including a hub, a spindle mounted in said hub, bearings between said hub and spindle, an oil retaining cup having a bulging surface mounted on the outer end of said hub, and a fan adapted to be rigidly secured to the end of said hub so as to engage the bulged end of said cup and force it inwardly whereby the periphery thereof will be forced radially against the inner surface of said hub to form an oil tight seal.

2. A fan construction including a hub, a spindle mounted in said hub, roller bearings between said hub and spindle, a plurality of end bearings mounted on one end of said spindle for taking up the outward and inward end thrust of said hub, an oil retaining cup for retaining oil in said bearings having a bulging surface mounted in the outer end of said hub, and a fan adapted to be rigidly secured to the end of said hub so as to engage the bulged end of said cup and force it inwardly whereby the periphery thereof will be forced radially against the inner surface of said hub to form an oil tight seal.

3. A fan construction including a hub member, a spindle extending through said hub member for supporting said construction, a retaining member provided with a bulging surface mounted on the outer end of said construction, and a fan adapted to be rigidly secured to the end of said hub so as to engage the bulged surface of said retaining member and yieldingly force it inwardly, whereby said member will be yieldingly forced against said construction for forming a seal and securing the parts thereof in their relative position to each other.

In witness whereof, I have hereunto affixed my signature.

RALPH C. ROOT.